April 25, 1961　　　R. L. OAKLEY　　　2,981,505
DEPLOYMENT SYSTEM FOR PARACHUTES
Filed July 6, 1956　　　　　　　　　　　　2 Sheets-Sheet 1
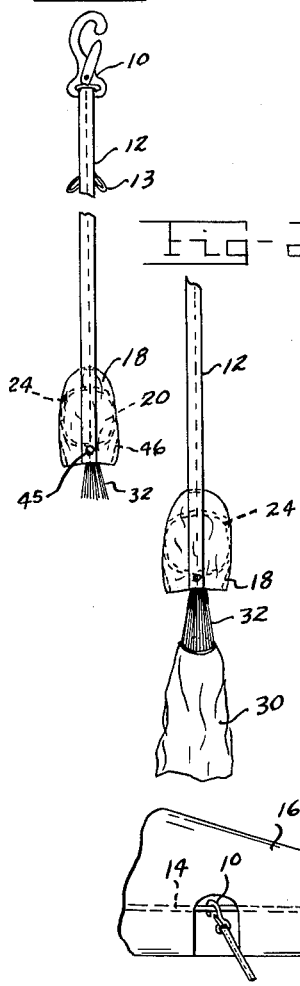
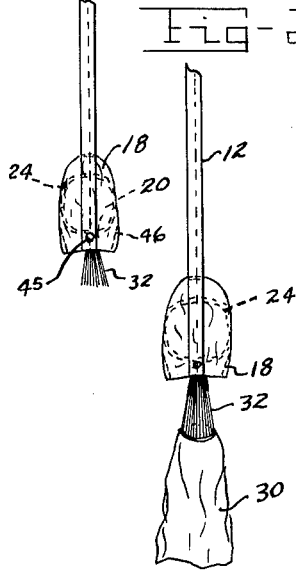
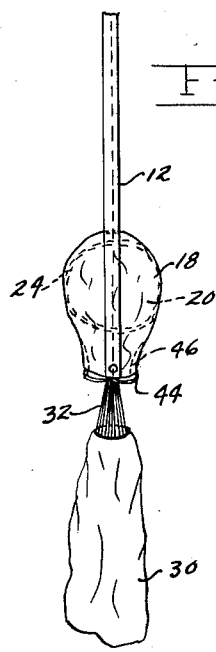
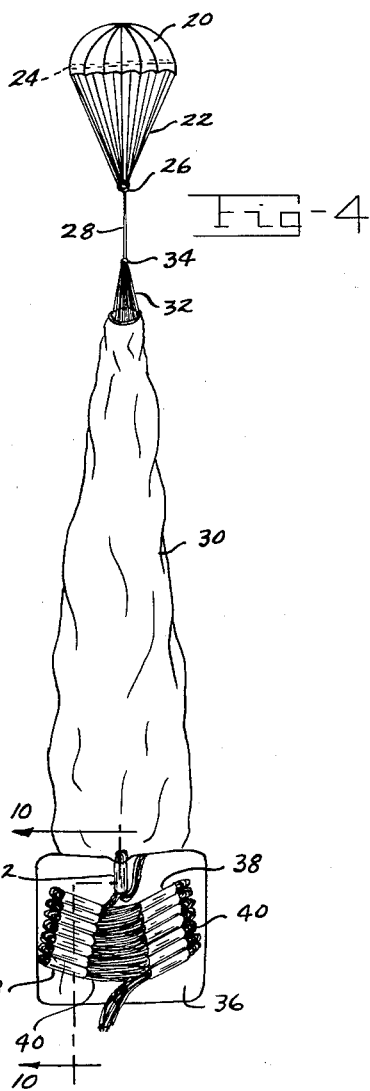
INVENTOR.
ROBERT L. OAKLEY
BY
ATTORNEYS

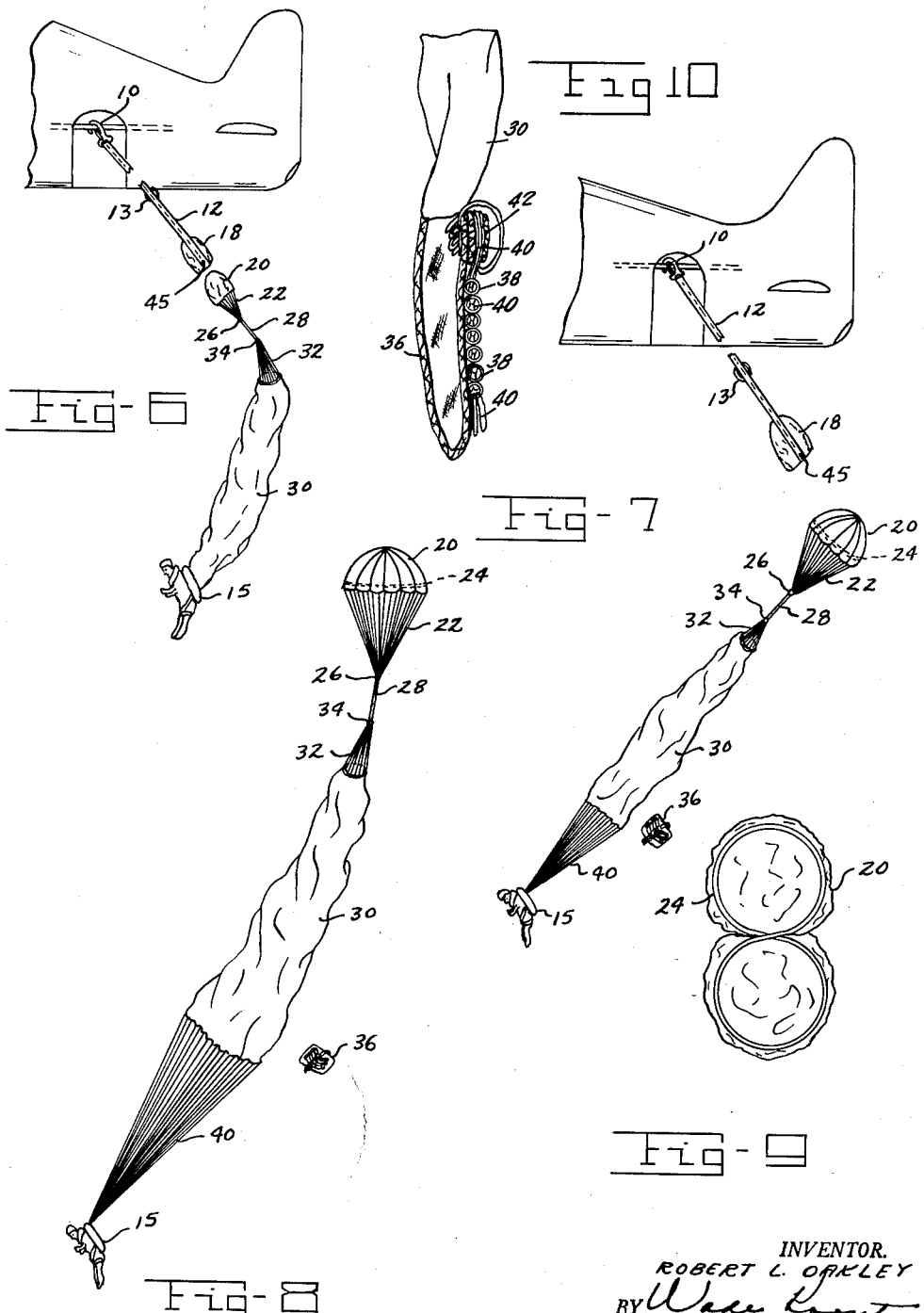

United States Patent Office 2,981,505
Patented Apr. 25, 1961

2,981,505
DEPLOYMENT SYSTEM FOR PARACHUTES
Robert L. Oakley, 401 Towanda Circle, Dayton 3, Ohio
Filed July 6, 1956, Ser. No. 596,371
5 Claims. (Cl. 244—149)
(Granted under Title 35, U.S. Code (1952), sec. 266)

The invention described herein may be manufactured and used by or for the United States Government for governmental purposes without payment to me of any royalty thereon.

This invention relates to a parachute deployment system, and more particularly, to improvements in method and apparatus for the release and deployment of parachutes, which meet the stringent requirements of high speed launching.

In the release and deployment of parachutes under conditions of high speed launching, many difficulties have been encountered. One of these is that as the jumper descends the unopened canopy of his parachute, still attached to the static lines, blows into a U-shape, which interferes seriously with its smooth deployment and opening.

The object of the present invention is to obviate these and other difficulties and provide a more successful system for main parachute and pilot parachute release and deployment, and one which better meets the difficult conditions of high speed launching.

A further object of the invention is the provision of a deployment system wherein the pilot parachute canopy is dropped from its envelope in the same operation which detaches the parachute system from the main static line, and at substantially the same time as the release of the shroud lines and skirt of the main parachute.

A further object of the invention is the provision of a parachute deployment system wherein a pilot parachute opens automatically and instantaneously before the main parachute is completely free of its pack and before it has begun to open thus providing stabilization during this stage.

A further object of the invention is the provision of a deployment system wherein the means which automatically opens the pilot parachute also constitutes the final attachment of the parachute system to the static line.

A further object of the invention is the provision of a deployment system which reduces shock forces by reducing to a minimum the drag area presented by the canopy at the instant of full extension of the suspension lines.

A further object of the invention is effecting delay in the complete deployment of the parachute canopy by including the parachute canopy in a deployment bag or pouch, rigging the bag closure and suspension-line-stowing arrangement in such a manner as to insure full deployment and extension of the suspension lines prior to final release of the canopy's skirt from the deployment bag, and after the pilot parachute has been freed from the static line and inflated.

Further objects and advantages will appear as the description proceeds.

In the drawing, Fig. 1 is a view of the static line and the pilot parachute casing or pocket.

Fig. 2 is a view of the pilot parachute casing showing the relationship between the static line, the pilot parachute and the main parachute.

Fig. 3 is a top portion of the main parachute in the process of the withdrawal of the pilot parachute from its casing or envelope.

Fig. 4 shows the system at the stage where the pilot parachute has opened and the main parachute has partly emerged from its casing.

Figs. 5, 6, 7 and 8 show the several steps of the deployment system in their order of occurrence.

Fig. 9 is a detailed view of the pilot parachute spring.

Fig. 10 is a cross section taken on the line 10—10 of Fig. 4.

Referring more in detail to the drawings, a hook or conventional snap fastener 10 secures a static line 12 to a cable or other support 14 located within an airplane 16. The main line 12 is provided with a loop 13 into which a frangible cord is tied for frangible securing of the parachute pack 15.

An envelope pocket or casing 18 is permanently secured to the static line 12.

In the process of packing the parachute, a pilot parachute 20 together with its shroud lines or vanes 22 is folded and packed within the envelope or casing 18. A resilient spring ring 24 is secured to the inner surface of the skirt edge of the pilot parachute 20 and forms a part of it. In the packing of the parachute, the spring ring 24, shown in detail in Fig. 9, may be turned into a "figure 8." The segments of the 8 are then folded over one another and the parachute thus folded is inserted within the envelope 18. The spring element may take a variety of forms. It has also been found successful to make the ring 24 half size and insert it without folding or turning into the casing 18. The extensive force of the spring in either case holds the parachute releasably within the envelope 18.

The shroud lines or vanes 22 of the pilot parachute 20 are gathered and tied to the bridle cord 28, which bridle cord connects the pilot parachute 20 to the apex of the main canopy 30. The apex of the main canopy may be formed optionally of a plurality of lines 32 tied to the bridle cord 28 at 34.

The lower skirt portion of the main canopy 30 is packed into a quarter deployment bag or envelope 36. The envelope 36 is provided on its exterior surface with a plurality of oppositely placed flute members 38. The suspension lines 40 of the main parachute are looped in sequence into the flute members 38, first on one side and then on the other as shown in detail on Fig. 4. This manner of packing the parachute canopy and shroud lines is shown in detail in the disclosure contained in the patent to Barnes et al. 2,749,066, June 5, 1956.

In deployment the loops 40 of the shroud lines are withdrawn from the flute members 38 one by one. When the last loop nearest the canopy, the loop which is drawn through a flute member 42, is released, the portion of the parachute canopy which is stowed in the quarter bag 36 is freed, and the skirt of the canopy 30 is freed for inflation.

Various means of a temporary or frangible nature may be used for retaining the pilot parachute canopy 20 within the pocket or envelope 18 until the proper time for withdrawal has been reached. As described above, the spring ring 18, either flat or in the folded "figure 8" formation, forms such a means. As alternative or additional means for this purpose, a frangible cord 44 may be secured into loops 46 provided on either side of the mouth of the pocket 18. The frangible cord 44 may be looped through the loops 46 and through the apex lines 32. The frangible tie 44 is sufficient to hold the mouth of the casing 18 closed and hold the canopy within the envelope for packing purposes. Pressure, however, ruptures the cord and allows the pilot parachute to emerge. Other means may be employed, such as snap fastener or button means 45, releasable or breakable upon the application of a predetermined force.

The operation of the device is as follows: At the time the jump is made, the complete system including a portion of the static line 12 is stowed within pouch 15, which is carried on the body of the parachutist in the usual and conventional manner. Frangible cords, not shown, close the pack 15 and tie into the loop 13 on the static line, stowing a portion of the static line within the pack 15. The hook 10 is secured to the cable 14 and the parachutist then makes his jump. As the fragible cords are broken, the static line 12 comes free of the pack 15. The top portion of the main canopy is withdrawn from the pack 15 as is shown in Fig. 6. The folded pilot parachute canopy 20 is retained within the envelope 18 until this partial deployment of the canopy 30 is accomplished. The force of the retention means, consisting of etiher the folded "figure 8" spring, the single layer spring, the frangible cord 44, the snap or button 45, or a combination of these, is overcome by the air drag force which is developed, and gives way at this point. The canopy 20 emerges from the casing 18, and all connection with the plane is severed. The spring ring 24 immediately and automatically serves to assist in the inflation of the canopy 20. When the canopy 30 is withdrawn and freed from the pack 15, the loops of shroud lines begin one by one to be withdrawn from the flute 38 into which they have been folded. When the last loop is withdrawn, the skirt edge of the canopy is released from its confinement within the quarter bag 36, and the smooth deployment and opening of the canopy 30 follows in uninterrupted sequence. The casing 36, having no permanent attachment, falls away. The jumper is stabilized and the velocity of the fall is dampened by the deployment system described.

In the USAF Handbook the term canopy covers the umbrella like fabric section providing the drag surface together with its shroud lines, suspension lines or vanes. As used in this description, the term applies generally only to the section providing the drag surface and does not include the suspension lines or vanes.

It is of importance that the upper portion of the main canopy be freed from the pack 15 prior to or at substantially the same moment that the pocket 18 is opened and the pilot parachute released. It is also of importance that the system be fully freed from the static line before the skirt edge of the main canopy is released. The bowing of the canopy, suggested slightly in Figs. 5 and 6, is prevented and the system allowed to develop into a substantially straight line as shown in Fig. 7, so that the main canopy is free to open.

While the invention is shown and described in connection with one form for illustrative, rather than restrictive purposes, it is obvious that minor changes and modifications may be made by those skilled in the art without departing from the scope and spirit of the invention as defined in the accompanying claims.

I claim:

1. A parachute deployment device which comprises a parachute pack, a main static line, means for retaining a portion of said static line within said pack when in stowed and packed condition, a hook on one end of said static line for securing the static line to an airplane, a pocket envelope structurally independent of the construction of said parachute pack and located on the other end of said static line, a pilot parachute and shroud lines therefor contained within said envelope when said device is in packed condition, a main parachute having an apex, a bridle connecting said pilot parachute to said apex, resilient means incorporated in said pilot parachute for retaining said pilot parachute within said pocket, said retaining means being yieldable to free said pilot parachute from said pocket upon a predetermined pull substantially equal to the air drag force on the main parachute at a time when said main parachute is partially withdrawn from said pack.

2. A parachute deployment device which comprises a parachute pack, a main static line, means for retaining a portion of said static line within said pack when in stowed and packed condition, a hook on one end of said static line for securing the static line to an airplane, a pocket envelope on the other end of said static line, a pilot parachute and shroud lines therefor contained within said envelope when said device is in packed condition, a main parachute having an apex, a bridle connecting said pilot parachute to said apex, means for retaining said pilot parachute within said pocket, said retaining means being yieldable to free said pilot parachute from said pocket upon a predetermined pull substantially equal to the air drag force on the main parachute at the time when said main parachute is partially withdrawn from said pack, said retaining means comprising a spring ring attached to the periphery of said pilot parachute canopy.

3. A deployment system for parachutes comprising a static line secured to an airplane, a main parachute, shroud lines attached to said main parachute, an envelope having permanent attachment to said static line and adapted to contain a pilot parachute, a pilot parachute contained in its folded condition within said envelope, shroud lines attached to said pilot parachute and also attached at the lower ends to a bridle cord, said bridle cord being attached to the apex of the main parachute canopy, resilient means incorporated in the body of said pilot parachute for securing said pilot parachute within said envelope when in folded and undeployed condition.

4. A parachute deployment device which comprises a parachute pack, a main static line, means for retaining a portion of said static line within said pack when in stowed and packed condition, a hook on one end of said static line for securing the static line to an airplane, a pocket envelope on the other end of said static line, a pilot parachute and shroud lines therefor contained within said envelope when said device is in packed condition, a main parachute having an apex, a bridle connecting said pilot parachute to said apex, means for retaining said pilot parachute within said pocket, said retaining means being yieldable to free said pilot parachute from said pocket upon a predetermined pull substantially equal to the air drag force on the main parachute at the time when said main parachute is partially withdrawn from said pack, said retaining means comprising a spring ring attached to the periphery of said pilot parachute canopy twisted to form a "figure 8" and folded again to form a double spring ring, said spring means also operating as instantaneous and automatic inflating means for said pilot parachute.

5. A parachute deployment device comprising a static line provided with a pocket container, a pilot parachute and shroud lines stowable in said pocket, resilient means incorporated in said pilot parachute for retaining said pilot parachute in said pocket, a main parachute, comprising canopy and shroud lines, attaching means for attaching said pilot parachute to the apex of said main parachute, a parachute pack for stowing said main parachute, said resilient means constituting a timing device for controlling the release and opening of said pilot parachute prior to the release of the skirt edge of said main parachute and coincident with the deployment of the upper part of the main canopy.

References Cited in the file of this patent

UNITED STATES PATENTS

| | | |
|---|---|---|
| 1,466,988 | Calthrop | Sept. 4, 1923 |
| 2,519,923 | Noelcke | Aug. 22, 1950 |
| 2,524,277 | Stewart | Oct. 3, 1950 |
| 2,593,432 | Freas | Apr. 22, 1952 |
| 2,702,679 | Culver | Feb. 22, 1955 |
| 2,749,066 | Barnes et al. | June 5, 1956 |

FOREIGN PATENTS

| | | |
|---|---|---|
| 931,870 | Germany | Aug. 18, 1955 |

OTHER REFERENCES

Parachutes, by W. D. Brown, London, Sir Isaac Pitman and Sons, Ltd., first published 1951.